United States Patent Office 3,359,984
Patented Dec. 26, 1967

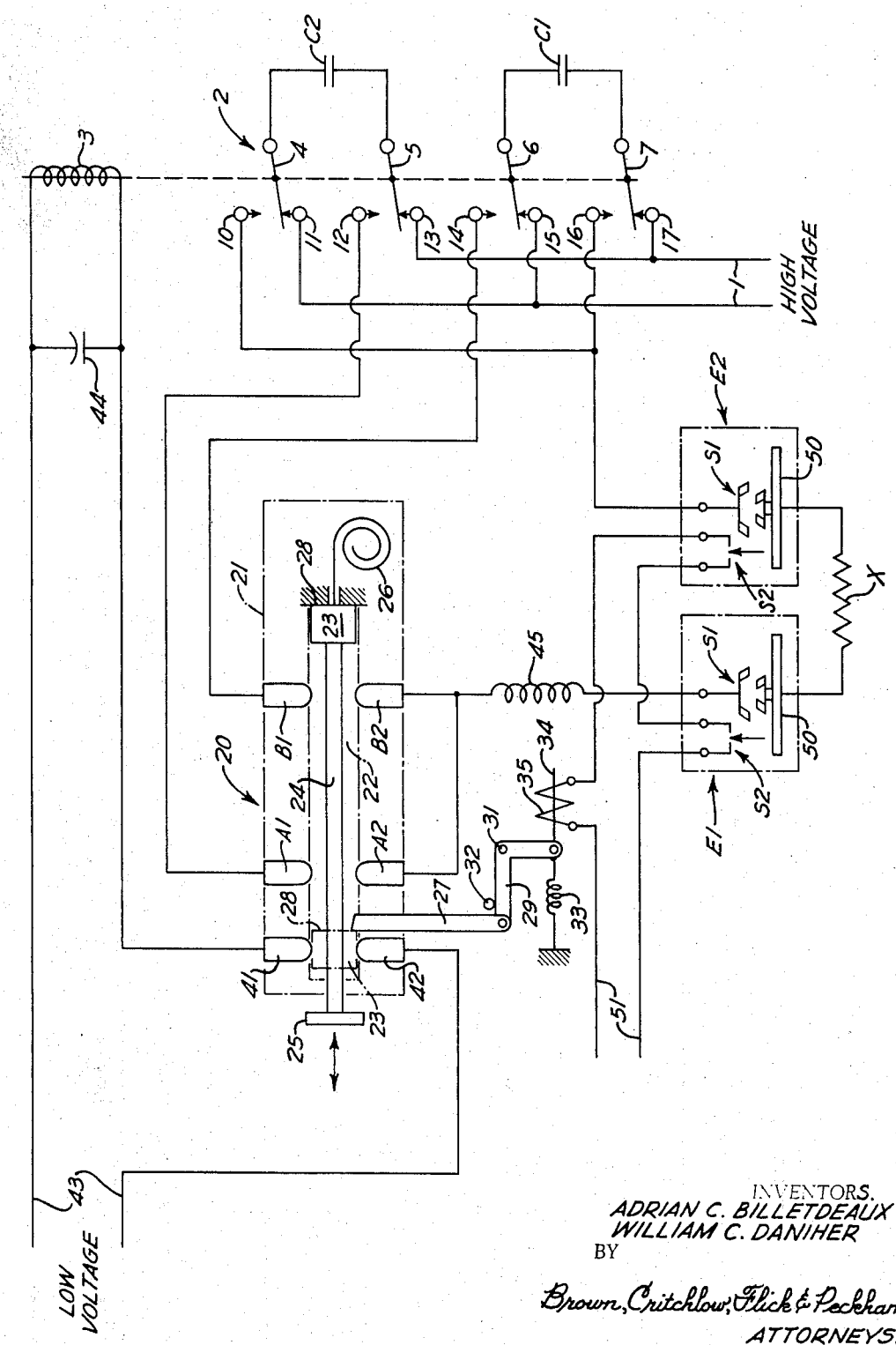

3,359,984
ELECTRICAL CIRCUIT FOR VENTRICULAR DEFIBRILLATOR
William C. Daniher, Verona, and Adrian C. Billetdeaux, Pittsburgh, Pa., assignors to Mine Safety Appliances Company, a corporation of Pennsylvania
Filed Nov. 3, 1964, Ser. No. 408,487
4 Claims. (Cl. 128—419)

ABSTRACT OF THE DISCLOSURE

This invention relates to a charging and discharging circuit for a ventricular defibrillator of the type used in arresting cardiac fibrillation by the delivery of rapid pulses of electrical current, represented by sequential discharges of a plurality of capacitors, through a patient's body in the region of the heart.

Background of the invention

It is among the objects of this invention to provide a charging and discharging circuit for a ventricular defibrillator of the above type, in which the external source of high voltage used to charge the capacitors cannot, because of accidental, negligent operation or component malfunction, be applied to the patient or the operator either during the charging of the capacitors or during their subsequent discharge through the body of the patient. A further object is to provide improved and simplified means for discharging a plurality of capacitors momentarily and sequentially through the patient's body.

Other objects will be apparent from the following description of a preferred embodiment of the invention, in connection with the attached drawing, showing a schematic diagram of the defibrillator circuit.

Summary of the invention

The defibrillator circuit of this invention comprises a capacitor charging circuit and a capacitor discharging circuit. The charging circuit includes an external source of high voltage direct current, a plurality of capacitors, and a charging switch that is operative in the first of its two positions to connect the capacitors in parallel to the current source. The discharging circuit includes a discharging switch, two electrodes that are adapted to be placed in contact with the patient's body, the capacitors, and the charging switch that is operative in the second of its two positions to disconnect the capacitors from the current source and connect them to the electrodes through the discharging switch. Spring-loaded armature means in the discharging switch are adapted to move from a cocked position to an uncocked position and, in so doing, to connect together separately, successively, and momentarily a plurality of sets of contacts that will sequentially discharge the capacitors through the patient's body. In addition, separate means are provided for cocking the discharging switch, for holding it in its cocked position, and for releasing it therefrom. Still other means become operative when the discharging switch is cocked to move the charging switch from its first to its second position and to hold it there so long as the discharging switch remains cocked and for an additional time thereafter during the movement of the armature means from their cocked to their uncocked position.

Referring to the drawing, a source 1 of high voltage direct current, on the order of 2500 volts, is connected through a charging switch 2 to a pair of capacitors C1 and C2. The charging switch is preferably a conventional relay type switch that includes a coil 3 and interconnected armatures or switch arms 4, 5, 6, and 7, the free ends of these arms being adapted to move between pairs of switch contacts 10–11, 12–13, 14–15, and 16–17, respectively. Capacitor C1 is connected between switch arms 6 and 7, and capacitor C2 between switch arms 4 and 5. In their normal position, when relay coil 3 is not energized, the switch arms occupy their first positions shown in the drawing, in which they engage switch contacts 11, 13, 15, and 17, and connect the capacitors in parallel in a charging circuit across the high voltage supply.

The circuit of this invention also includes a discharging circuit, which is intermittently operative and which contains some of the elements of the charging circuit. The discharging circuit includes a discharging switch 20, electrodes E1 and E2 adapted to be placed in contact with the patient's body in the vicinity of the chest, the capacitors C1 and C2, and charging switch 2 with the switch arms 4–7 in their second positions (in which they engage switch contacts 10, 12, 14, and 16, respectively). The sequence switch 20, shown partly in section and somewhat diagrammatically includes a switch block 21 with a hollow bore 22, in which slides an armature 23. Connected thereto is a rod 24, which extends outside of the switch block and is provided with a handle 25. The armature is urged by suitable spring means 26 (for example, a filament attached to a coil spring) towards the right hand end of the switch block, representing the uncocked position of the armature. By means of handle 25, the armature can be moved manually to its cocked position at the other end of the switch block, where it occupies the broken line position shown in the drawing. The armature is held in its cocked position against the urging of spring 26 by a latching pin 27 extending through the side of the switch block and engaging the forward end 28 of the armature. Pin 27 is connected to a bell crank 29, which is supported on a pivot 31 and urged into latching position against a stop 32 by a spring 33 and into an unlatching position by an armature 34 of a solenoid 35. Between the cocked and uncocked positions of armature 23, two sets of pairs of electrical contacts are arranged in the switch block for successive, separate, momentary engagement with the armature as it moves from its cocked to its uncocked position. The first set of contacts A1 and A2 are arranged in the same transverse plane adjacent to but spaced from the armature 23 when the latter is in its cocked position. The other set of contacts B1 and B2 are also arranged in the same transverse plane but adjacent the other end of the switch block and spaced from the armature when it is in its uncocked position. Both sets of contacts may be in the form of metal buttons, preferably spring loaded, and adapted to be engaged by the armature as it moves in its axial passage from one end of the switch block to the other. The armature is made of conducting material and, when it engages contacts A1 and A2, it interconnects them electrically, and subsequently does the same for contacts B1 and B2. It should be noted that the two sets of contacts are spaced far enough from each other that the armature cannot engage both sets of contacts at the same time. The distance separating the sets of contacts and the tension on spring means 26 are parameters that control the interval between the armature's successive engagements with the first and second sets of contacts and, therefore, the interval between the successive electrical discharges applied to the patient.

Discharging switch 20 is also provided with a pair of opposed contacts 41 and 42 that are similar to contacts A and B and are electrically interconnected by the armature in its cocked position. Contacts 41 and 42 are connected in series with a source of low voltage current 43 and relay coil 3 of charging switch 2. A timing capacitor 44 is connected across coil 3. Contacts A1 and B1 are connected to switch arms 12 and 14, respectively, of charging switch 2; and contacts A2 and B2 are connected through a choke coil 45 to a normally open switch S1 in electride E1. Switch contacts 10 and 16 are connected to a similar switch S1 in electrode E2. The other side of each switch S1 is connected to a conducting contact surface 50 on the bottom of each electrode. A second normally open switch S2 is also disposed in each of the electrodes and controls the firing of discharging switch 20. This is done by connecting both switches S2 in series with a source 51 of low voltage current and solenoid 35. The latter, when energized, operates the bell crank 29 to release armature 23 from its cocked position. Electrode switches S1 and S2 are adapted to be closed in succession by firmly pressing the contact surface 50 of each electrode on the patient's body against the urging of a spring (not shown), so that the contact surfaces are connected to the discharging switch contacts A2 and B2 a moment before that switch is fired to move the armature therein towards its uncocked position. Further details of the structure and operation of electrodes E1 and E2 and of switches S1 and S2 are described in the copending application of Earl M. Becker and William C. Stuckrath, Ser. No. 204,949 filed on June 25, 1962, now Patent No. 3,224,447, issued Dec. 21, 1965, and assigned to the same assignee.

In operating this device, the charging switch 2 is initially in its non-energized position shown in the drawing, in which capacitors C1 and C2 are connected to the high voltage source and are charged to the appropriate operating voltage. When the patient is ready for the application of defibrillating pulses, discharging switch 20 is manually cocked so that armature 23 is in its latched, broken-line position shown in the drawing. So long as the armature remains in its cocked position, it closes the low voltage circuit across relay coil 3 and that relay will remain energized. Switch arms 4–7 will accordingly be held in their second position, in which they engage switch contacts 10, 12, 14, and 16, respectively. In this position, the capacitors C1 and C2 are disconnected entirely from high voltage power supply and one side of each capacitor is connected directly to switch S1 of electrode E2. So long as armature 23 remains in its cocked position, however, no current is transmitted from the capacitors to the electrodes and the patient. The operator then grasps electrodes E1 and E2 by suitably insulated handles (not shown) and pushes the electrode plates 50 against the body of the patient, thereby closing first switches S1 and then switches S2 in each electrode. With the closing of switches S2, solenoid 35 is energized and pulls latch pin 27 to release armature 23, which moves rapidly to the right under the urging of spring means 26. As the armature passes between contacts A1 and A2, it closes the circuit that permits a pulse from the discharge of capacitor C2 to pass through the electrodes and the patient's body, here represented by a resistance X. As the armature continues to move rapidly towards its uncocked position, it passes between contacts B1 and B2, permitting a pulse of current from the discharge of capacitor C1 to pass through the electrodes and the patient's body. It will be noted that capacitors C1 and C2 are so connected in the circuit that the positive side of capacitor C2 is connected to electrode E2 and that the negative side of capacitor C1 is connected to the same electrode. As a result, the capacitors will discharge through the patient's body in reverse directions.

Armature 23 desirably moves from its cocked to its uncocked position in about 16 milliseconds, with each capacitor discharge lasting about 4 milliseconds and with about 6 milliseconds between the successive discharges. These intervals can be varied within desired limits by suitable adjustments, for example, by varying the tension of spring means 26 or the mass of armature 23 or the axial spacing between the A and B contacts. During the passage of the armature from its cocked to its uncocked position, charging switch 2 stays in its energized position in which the capacitors remain connected to the electrodes, although relay coil 3 is disconnected from its current source. This is accomplished by the delaying action of timing capacitor 44, which is connected across relay coil 3. By selecting a suitable value for this capacitor, the relay coil can be held in its energized position for more than enough time (for example, 50 milliseconds) than is required for the armature to move to its uncocked position (16 milliseconds). When relay coil 3 is finally deenergized, armature 23 is in its uncocked position, and capacitors C1 and C2 immediately begin to be recharged from the high voltage power supply.

In view of the high voltages involved and the increasingly widespread use of portable defibrillators, which must often be operated by unskilled persons, it is of paramount importance that defibrillator equipment be perfectly safe to use. It will be apparent that neither accident nor negligent operation nor component malfunction can create a situation in which the high voltage power supply may be connected across the electrodes to cause possible injury to the operator or patient. Not only is the power supply connected to fixed switch contacts 11, 13, 15, and 17, but also the electrodes are connected (through discharging switch 20) to other fixed switch contacts in the same charging switch; and these fixed contacts are rigidly spaced from each other. The movable switch arms 4–7 of the charging switch connect capacitors C1 and C2 either to the high voltage power supply or to the discharge circuit that includes the electrodes. Even if timing capacitor 44 failed to hold relay coil 3 energized during the movement of armature 23 from its cocked to its uncocked position, the only result would be that switch arms 4–7 would resume their normal charging positions and the electrodes would be isolated from any current source.

A further advantage of the circuit herein described is that it greatly simplifies the construction and operation of the discharging switch 20, as compared, for example, with that of a similar switch described in the copending application of Earl M. Becker and John J. Bridge, Ser. No. 204,947 filed June 25, 1962, now Patent No. 3,211,154, issued Oct. 12, 1965, and assigned to the same assignee. In the present circuit, discharging switch 20 has only two sets of sequential contacts, where four such sets and twin armatures (insulated from each other) are required in the earlier circuit to perform the same function of connecting a pair of capacitors momentarily and sequentially to electrodes in contact with the patient's body. Accordingly, the discharging switch described in this invention may be made smaller in size and of fewer components and is better adapted for use in portable equipment than switches heretofore available.

A still further advantage of the circuit of this invention is that it permits the use of a conventional electromagnetic relay switch as the charging switch 2. These switches have been developed to the point where they are exceedingly reliable, and a two position switch of the type herein described will have a spring biased normal first position and a second position that is adapted to occupy and hold when its electromagnet is energized and so long as it remains energized.

According to the provisions of the Patent Statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. In a ventricular defibrillator for delivering successive pulses of electrical current from a plurality of capacitors to a pair of electrodes in contact with a patient's body, the combination comprising a source of high-voltage direct current and at least two capacitors and a pair of electrodes and a charging switch and a discharging switch, the charging switch having two positions in the first of which it connects the capacitors in parallel to the high-voltage source and disconnects those same elements completely from the discharging switch and the electrodes, the discharging switch having conducting armature means movable between cocked and uncocked positions and having a plurality of pairs of contacts, each of said pairs of contacts being connected together separately and successively and momentarily by the armature means when said means moves from its cocked to its uncocked position, means for cocking the discharging switch, means for releasably holding the discharging switch in its cocked position, and means operative when the discharging switch is in its cocked position to move the charging switch from its first position to its second position, said last mentioned means including electromagnetic means that are connected in series with a source of current by the armature means when the latter is in its cocked position, the charging switch in its second position disconnecting the high-voltage source completely from the capacitors and from the discharging switch and the electrodes and connecting a first side of each capacitor to the first electrode and the other side of a first capacitor to a contact in a first of said pairs of discharging switch contacts and connecting the other side of a second capacitor to a contact in a second of said pairs of contacts, the other contact of each of said pairs of contacts being connected to the second electrode, and means for moving the discharging switch from its cocked to its uncocked position to provide sequential pulses of current through the electrodes and the patient's body.

2. Apparatus according to claim 1, in which a separate capacitor is connected across said electromagnetic means to effect a time delay in the deenergization of the electromagnetic means after said means is disconnected from the current source when the armature means moves from its cocked position towards its uncocked position.

3. In a ventricular defibrillator for delivering successive pulses of electrical current from a plurality of capacitors to a pair of electrodes in contact with a patient's body, the combination comprising a source of high-voltage direct current and at least two capacitors and a pair of electrodes and a charging switch and a discharging switch, the charging switch having two positions in the first of which it connects the capacitors in parallel to the high-voltage source and disconnects those same elements completely from the discharging switch and the electrodes, the discharging switch having conducting armature means movable between cocked and uncocked positions and having a plurality of pairs of contacts, each of said pairs of contacts being connected together separately and successively and momentarily by the armature means when said means moves from its cocked to its uncocked position, means for cocking the discharging switch, means for releasably holding the discharging switch in its cocked position, and means operative when the discharging switch is in its cocked position to move the charging switch from its first position to its second position, means for holding the charging switch in its second position when the discharging switch is in its cocked position and also during movement of the discharging switch from its cocked to its uncocked position, the charging switch in its second position disconnecting the high-voltage source completely from the capacitors and from the discharging switch and the electrodes and connecting a first side of each capacitor to the first electrode and the other side of a first capacitor to a contact in a first of said pairs of discharging switch contacts and connecting the other side of a second capacitor to a contact in a second of said pairs of contacts, the other contact of each of said pairs of contacts being connected to the second electrode, and means for moving the discharging switch from its cocked to its uncocked position to provide sequential pulses of current through the electrodes and the patient's body.

4. In a ventricular defibrillator for delivering successive pulses of electrical current from a plurality of capacitors through a pair of electrodes in contact with a patient's body, the combination comprising a source of high-voltage direct current and at least two capacitors and the pair of electrodes and a charging switch and a discharging switch, the charging switch having two positions in the first of which it connects the capacitors in parallel to the high-voltage source and disconnects those same elements completely from the discharging switch and the electrodes, the discharging switch including a switch block provided with a central bore and conducting armature means slidably received for axial movement in the bore between cocked and uncocked positions and a plurality of pairs of contacts mounted in the switch block with their contact surfaces exposed within the bore for sliding electrical contact with the surface of the armature means as it moves through the bore, the contacts of each pair of contacts lying substantially in the same transverse plane and with adjacent pairs of contacts spaced axially from each other by a distance greater than the axial extent of the surface of the armature means, whereby each pair of said contacts is connected together separately and successively and momentarily by the armature means when said means moves from its cocked to its uncocked position, means for cocking the discharging switch, means for releasably holding the discharging switch in its cocked position, and means operative when the discharging switch is in its cocked position to move the charging switch from its first position to its second position, the charging switch in its second position disconnecting the high voltage source completely from the capacitors and from the discharging switch and the electrodes and connecting one side of each capacitor to the first electrode and the other side of a first capacitor to a contact in a first of said pairs of discharging switch contacts and connecting the other side of a second capacitor to a contact in a second of said pairs of contacts, the other contact of each of said pairs of contacts being connected to the second electrode, and means for moving the discharging switch from its cocked to its uncocked position to provide sequential pulses of current through the electrodes and the patient's body.

References Cited

UNITED STATES PATENTS

| | | | |
|---|---|---|---|
| 2,622,200 | 12/1952 | Hudgson | 128—423 |
| 3,093,136 | 6/1963 | Lohr | 128—423 |

FOREIGN PATENTS

| | | |
|---|---|---|
| 864,262 | 4/1961 | Great Britain. |

RICHARD A. GAUDET, *Primary Examiner.*

W. E. KAMM, *Assistant Examiner.*